US011589650B2

(12) United States Patent
Kwiatkowski (10) Patent No.: US 11,589,650 B2
(45) Date of Patent: Feb. 28, 2023

(54) SLIP RESISTANT SHOE (71) Applicant: Stefanie Miller Kwiatkowski, Detroit, MI (US)

(72) Inventor: Stefanie Miller Kwiatkowski, Detroit, MI (US)

( * ) Notice: Subject to any disclaimer, the term of this patent is extended or adjusted under 35 U.S.C. 154(b) by 0 days.

(21) Appl. No.: 16/636,384

(22) PCT Filed: Aug. 6, 2018

(86) PCT No.: PCT/US2018/045439
§ 371 (c)(1),
(2) Date: Feb. 4, 2020

(87) PCT Pub. No.: WO2019/028475
PCT Pub. Date: Feb. 7, 2019

(65) Prior Publication Data
US 2020/0170344 A1 Jun. 4, 2020

Related U.S. Application Data (60) Provisional application No. 62/541,577, filed on Aug. 4, 2017.

(51) Int. Cl.
*A43B 13/22* (2006.01)
(52) U.S. Cl.
CPC .................. *A43B 13/223* (2013.01)
(58) Field of Classification Search
CPC ......... A43B 13/22; A43B 13/223; A43B 3/00; A43B 3/12; A43B 3/124; A43B 5/12; A41B 11/008; A41B 11/08
See application file for complete search history.

(56) References Cited

U.S. PATENT DOCUMENTS

| | | | | |
|---|---|---|---|---|
| 335,704 A | * | 2/1886 | Hoult | A41B 11/01 66/178 R |
| 1,518,758 A | * | 12/1924 | Rodee | A41B 11/08 602/65 |
| 1,543,353 A | * | 6/1925 | Wolff | A41B 11/08 2/61 |
| 1,665,946 A | * | 4/1928 | Boehme | D04B 11/28 66/183 |
| 1,788,852 A | * | 1/1931 | Arthur | A61F 13/064 602/66 |

(Continued)

FOREIGN PATENT DOCUMENTS

| | | | | |
|---|---|---|---|---|
| GB | 2450596 A | * | 12/2008 | A43B 5/08 |
| NZ | 539463 A | * | 10/2006 | A43B 5/12 |
| WO | WO-2017085514 A1 | * | 5/2017 | A41B 11/007 |

*Primary Examiner* — Heather Mangine
*Assistant Examiner* — Raquel M. Weis
(74) *Attorney, Agent, or Firm* — Cargill & Associates PLLC; Lynn. E. Cargill (57) ABSTRACT

Disclosed is a novel non-slip grippy ventilated shoe made of a slip resistant material with a failure mode of from 1 to 50 Newtons/millimeter, and is generally made of a cage-like configuration to provide maximum slip resistance as well as ventilation with minimum structure, just sufficient enough structure to allow the shoe to provide grip on a surface. The shoe is useful in performing floor exercises such as barre, yoga and pilates among other applications such as water sports like surfing where grip is important, or for hospital settings for fall risk patients to alleviate the risk of falling.

2 Claims, 6 Drawing Sheets

(56) References Cited

U.S. PATENT DOCUMENTS

| | | | | |
|---|---|---|---|---|
| 1,930,188 A * | 10/1933 | Arthur | A61F 13/064 | 602/66 |
| 2,075,229 A * | 3/1937 | Rose | A43B 5/08 | D2/962 |
| 2,237,652 A * | 4/1941 | Capezio | A43B 5/12 | 36/94 |
| 2,239,206 A * | 4/1941 | Tietig | A43B 3/124 | 36/154 |
| 2,292,643 A * | 8/1942 | Layana | A61F 13/065 | 602/66 |
| 2,332,252 A * | 10/1943 | Payne | A43B 5/08 | 2/22 |
| 2,486,886 A * | 11/1949 | Saukkonen | A43B 3/124 | 36/8.1 |
| 2,541,738 A * | 2/1951 | Bassichis | A43B 5/08 | 36/8.1 |
| 2,771,691 A * | 11/1956 | Luchs | A43B 17/00 | 36/145 |
| 2,954,617 A * | 10/1960 | Yamaguchi | A43B 5/08 | D2/896 |
| 3,417,408 A * | 12/1968 | Caggiano | A43B 3/24 | 2/239 |
| 3,520,838 A * | 7/1970 | Burke, Jr. | C09B 63/00 | 525/218 |
| 3,603,006 A * | 9/1971 | Davenport | A43B 3/106 | 36/11.5 |
| 3,605,292 A * | 9/1971 | Goldblatt | A43B 13/226 | 36/8.1 |
| 3,676,940 A * | 7/1972 | Shively | A43B 13/223 | 248/362 |
| 3,724,458 A * | 4/1973 | Piper | A61F 13/068 | 602/62 |
| 4,085,745 A * | 4/1978 | Alenares | A61F 13/064 | 602/66 |
| 4,251,932 A * | 2/1981 | Love | A43B 3/16 | 36/7.7 |
| 4,277,897 A * | 7/1981 | O'Connell | A43B 5/12 | 36/106 |
| 4,476,858 A * | 10/1984 | Curtis | A43B 19/00 | 602/23 |
| 5,054,129 A * | 10/1991 | Baehr | A41B 11/004 | 2/242 |
| 5,437,616 A * | 8/1995 | Kasahara | A61F 5/019 | 602/30 |
| 5,460,601 A * | 10/1995 | Shannahan | A61F 13/065 | 602/65 |
| 5,682,617 A * | 11/1997 | Tumas | A41B 11/00 | 604/293 |
| 5,737,853 A * | 4/1998 | Smejkal | A43B 3/101 | 36/11.5 |
| 5,865,779 A * | 2/1999 | Gleason | A61F 13/067 | 602/30 |
| 5,867,838 A * | 2/1999 | Corry | A41B 11/08 | 66/178 R |
| 5,943,792 A * | 8/1999 | Powell | A43C 15/12 | 36/62 |
| 6,018,888 A * | 2/2000 | Wilkenfeld | A43B 3/102 | 36/73 |
| 6,178,662 B1 * | 1/2001 | Legatzke | A43B 13/20 | 36/43 |
| 6,766,536 B1 * | 7/2004 | Aarons | A41D 19/01558 | 2/161.3 |
| 7,051,457 B1 * | 5/2006 | Huggins | A43B 5/12 | 602/61 |
| 7,107,626 B1 * | 9/2006 | Andrews | A41B 11/004 | 2/239 |
| D551,430 S * | 9/2007 | Wilkenfeld | D2/902 | |
| 7,346,935 B1 * | 3/2008 | Patterson | A41B 11/008 | 2/239 |
| 7,346,936 B2 * | 3/2008 | Vargas | A43B 7/146 | 2/239 |
| 7,383,591 B1 * | 6/2008 | Getzwiller | A63B 71/14 | 36/114 |
| D606,729 S * | 12/2009 | Venturelli | D2/896 | |
| 7,673,396 B2 * | 3/2010 | Terlizzi | A43B 7/1435 | 36/9 R |
| 7,856,739 B2 * | 12/2010 | Terlizzi | A43B 7/144 | 36/9 R |
| 7,934,325 B2 * | 5/2011 | Sokolowski | A43B 13/223 | 36/8.3 |
| 7,971,374 B2 * | 7/2011 | Hernandez | A43B 5/06 | 36/94 |
| 8,240,066 B2 * | 8/2012 | Logan | A61F 5/0111 | 36/145 |
| 8,448,350 B2 * | 5/2013 | Nataadiningrat | A43B 7/1425 | 36/9 R |
| 9,038,201 B2 * | 5/2015 | Lee | A61H 7/007 | 2/239 |
| 9,609,896 B2 * | 4/2017 | Crosby | A43B 13/22 | |
| 9,681,699 B2 * | 6/2017 | Kalina | A43B 1/0081 | |
| 9,918,513 B2 * | 3/2018 | Vakili | A43B 3/124 | |
| 10,021,919 B2 * | 7/2018 | Spicuzza | A41B 11/007 | |
| 10,206,449 B1 * | 2/2019 | Weber | A43B 3/102 | |
| 10,716,336 B2 * | 7/2020 | McCuaig | A41B 11/008 | |
| 10,959,469 B2 * | 3/2021 | Millet | A61F 5/019 | |
| 10,993,480 B2 * | 5/2021 | Kim | A41B 11/007 | |
| 2002/0144437 A1 * | 10/2002 | Davis | A43B 5/00 | 36/25 R |
| 2003/0074718 A1 * | 4/2003 | English | A41B 11/004 | 2/239 |
| 2003/0166364 A1 * | 9/2003 | Gamble | A43B 5/08 | 441/74 |
| 2004/0025372 A1 * | 2/2004 | Watanabe | A43C 11/1493 | 36/8.1 |
| 2004/0045191 A1 * | 3/2004 | LaDuca | A43B 13/16 | 36/8.3 |
| 2004/0261289 A1 * | 12/2004 | Lindsay | A43B 7/142 | 36/11.5 |
| 2006/0107444 A1 * | 5/2006 | Huggins | A41B 11/02 | 2/239 |
| 2006/0179549 A1 * | 8/2006 | Huggins | A43B 7/28 | 2/239 |
| 2006/0185195 A1 * | 8/2006 | Weisner | A43B 13/203 | 36/11 |
| 2006/0195972 A1 * | 9/2006 | Alley | A41B 11/008 | 2/239 |
| 2006/0196078 A1 * | 9/2006 | Terlizzi | A43B 7/1435 | 36/8.3 |
| 2006/0196079 A1 * | 9/2006 | Terlizzi | A43B 5/12 | 36/8.3 |
| 2006/0288609 A1 * | 12/2006 | Wilkenfeld | A43B 13/16 | 36/8.3 |
| 2007/0006486 A1 * | 1/2007 | Wilkenfeld | A43B 3/00 | 36/8.3 |
| 2007/0022627 A1 * | 2/2007 | Sokolowski | A43B 23/0235 | 36/3 A |
| 2008/0034613 A1 * | 2/2008 | Wilkenfeld | A43B 13/16 | 36/102 |
| 2008/0110045 A1 * | 5/2008 | Terlizzi | A43B 7/144 | 36/8.3 |
| 2009/0064540 A1 * | 3/2009 | Sokolowski | A43B 13/223 | 36/114 |
| 2009/0090028 A1 * | 4/2009 | Moramarco | A43B 3/102 | 36/71 |
| 2009/0100715 A1 * | 4/2009 | Broadley | A43B 5/12 | 36/102 |
| 2009/0260261 A1 * | 10/2009 | Schroepfer | A43B 5/12 | 36/8.3 |
| 2009/0265838 A1 * | 10/2009 | Lee | A41B 11/08 | 112/475.12 |
| 2009/0272009 A1 * | 11/2009 | Weisner | A43B 13/203 | 36/102 |
| 2009/0288314 A1 * | 11/2009 | Kay | A43B 3/18 | 36/7.1 R |
| 2010/0088804 A1 * | 4/2010 | Crosby | A41B 11/008 | 2/239 |

(56) References Cited

U.S. PATENT DOCUMENTS

| | | | | |
|---|---|---|---|---|
| 2010/0095434 A1* | 4/2010 | Stuart | A41B 11/008 | 2/247 |
| 2010/0154251 A1* | 6/2010 | Nataadiningrat | A43B 5/12 | 36/71 |
| 2011/0113530 A1* | 5/2011 | Ballard | A41B 11/004 | 2/239 |
| 2011/0296715 A1* | 12/2011 | Howell | A43B 7/26 | 36/136 |
| 2012/0066938 A1* | 3/2012 | French | A43B 13/14 | 36/25 R |
| 2012/0198730 A1* | 8/2012 | Burch | A43B 23/0245 | 264/138 |
| 2012/0291314 A1* | 11/2012 | Sokolowski | B32B 27/12 | 36/87 |
| 2012/0317841 A1* | 12/2012 | Taylor | A43B 3/0084 | 36/103 |
| 2013/0104420 A1* | 5/2013 | Heathcote | A43B 5/12 | 36/102 |
| 2013/0152275 A1* | 6/2013 | Crosby | A41B 11/008 | 2/239 |
| 2013/0160192 A1* | 6/2013 | Stuart | A43B 17/00 | 2/240 |
| 2013/0198922 A1* | 8/2013 | Wittman | A63B 71/1225 | 2/22 |
| 2013/0269211 A1* | 10/2013 | Deans | A41B 11/008 | 524/588 |
| 2013/0283637 A1* | 10/2013 | Wilkenfeld | A43B 7/26 | 36/8.3 |
| 2014/0033567 A1* | 2/2014 | Heathcote | A43B 5/12 | 36/92 |
| 2014/0208619 A1* | 7/2014 | Kenens | A43B 13/04 | 521/134 |
| 2014/0223770 A1* | 8/2014 | Fallow | A43B 5/12 | 36/83 |
| 2014/0259737 A1* | 9/2014 | Fedele Hartwell | A43B 5/12 | 36/8.3 |
| 2014/0298569 A1* | 10/2014 | Lee | A61H 7/001 | 2/239 |
| 2014/0373288 A1* | 12/2014 | Greene | A43B 23/0245 | 12/142 R |
| 2015/0033582 A1* | 2/2015 | Colpack | A43B 23/0215 | 12/142 E |
| 2015/0157086 A1* | 6/2015 | Lazaris | A43B 3/102 | 36/114 |
| 2017/0347723 A1* | 12/2017 | Millet | A61F 13/067 | |
| 2018/0027920 A1* | 2/2018 | Choi | A43B 5/08 | |
| 2018/0098597 A1* | 4/2018 | Coleman | A43B 3/128 | |
| 2018/0242687 A1* | 8/2018 | Granger | A43B 7/143 | |

* cited by examiner

SLIP RESISTANT SHOE

CROSS-REFERENCE TO RELATED APPLICATIONS

This application claims the benefit under 35 U.S.C. 119(e) of U.S. Provisional Application No. 62/541,577 filed on Aug. 4, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to slip resistant shoes, methods of manufacturing same, and methods of using same. More particularly, the invention relates to a slip resistant shoe suitable for several applications, including barre style exercise and/or yoga, as well as for water sports and non-slip shoes useful in hospital and convalescent settings for fall risk patients.

2. Description of the Prior Art

Conventional slip resistant shoes are well known in the art, including one of the most common types of footwear that includes sport shoes, and non-slip hospital and shower applications. Most commonly, a sock and shoe combination is used for sports. Numerous footwear companies have found great success in making and selling shoes for every conceivable type of sport, such as running shoes, walking shoes, tennis shoes, boating shoes, and the list goes on and on. As one can see, there are shoes for nearly every type of exercise. Such shoes are sport-specific, and the physical properties of the materials used for these various shoes are designed for the particular sport. The type of exercise shoes is specifically chosen to enhance the performance of the sport participant. For example, running shoes include impact zones to lessen the jarring of a runner from pounding on pavement, while walking shoes are comfortably padded to alleviate any stress zones on their feet. Boating shoes are generally made of a white rubber like material so that scuffing on a white boat deck are minimized. Water board sports need a lightweight non-slip shoe with drainage to let water out of the shoe. Shower shoes and non-slip shoes are used extensively in hospitals to alleviate fall risk.

However, practitioners of those types of specific shoe design inventions have become aware of certain problems which are presented by those prior art inventions. In addressing floor exercises, like yoga or barre, slippage needed to be minimized in order to properly perform the floor exercises. In addition to the slippage issue, one particular problem that has plagued users has been that pressure points make the shoe uncomfortable during exercising. There are certain complexities in the material selection which give rise to preventing slipping on hard floor surfaces.

It would be desirable to the yoga or barre exercise shoe industry if there was provided a new controlled resiliency material shoe to prevent slippage, reduce pressure points, as well as being made of a material that is easy to wash, along with a method of making such a resilient shoe, and a method of using the resilient shoe.

It would also be desirable to the healthcare industry because an anti-slip, stretchy shoe will be in useful in showers and hospitals for use by fall-risk patients. Furthermore, a puncture resistant shoe is desirable for use in beachcombing and swimming, to alleviate injuries from contacting sharp rocks and/or broken bottles on a beach or in the water.

SUMMARY OF THE INVENTION

In accordance with the above-noted desires of the industry, the present invention provides a novel shoe design enabling various aspects, including a yoga or barre studio slip resistant shoe made of a new resilient gummy-type material, a method of making same, and a method of using it. This overcomes many of the aforementioned problems with the prior art because the present shoe will not slip on a multitude of surfaces without applying pressure points making the shoe uncomfortable. Furthermore, a conventional sock may be used inside the shoe, and this sock may be machine washed without needing to wash the shoe.

Specifically, designed novel recesses in the sides, top and bottom of the shoe provide sufficient structure while allowing for more stretching and conforming to the foot of the person exercising, without enclosing their foot entirely and giving more air to prevent foot sweating. The present invention preferably includes an open toe region recess to aid in the comfort of the shoe. These same recesses also provide sufficient drainage routes to make these shoes into good swimming shoes, or other applications where the foot need not be fully covered to be a good performance shoe. As the present shoe is made of a proprietary stretchy and resilient material that is resistant to puncture, it grips a floor surface just enough so that the person exercising will not experience slippage during technical exercise maneuvers, nor will sharp objects puncture them. These properties were difficult to attain, especially after considering that the shoe is designed to hold the natural structure of your foot while improving your balance. Designed for long-continued use, the shoes of the present invention can act as performance skins made of a lightweight, durable material that is constructed to last, unlike many other wraps or studio shoes that are delicate and easily fray. These shoes exhibit improved motion control, balance and strength with superior traction and grip. By achieving a solid footing, users are now able to form a better posture, which in turn creates an improved workout experience with more control and a better performance by keeping feet supported and stable.

The invention is particularly useful for applications of various floor exercises, including Barre, Yoga, and Pilates or swimming to name a few. Other applications for the present novel shoe design include any other activity which requires a non-slip type of shoe, ie. hospitals and fall risk patients would also find full utility. For fall risk patients, hospitals are conventionally using a knitted sock with slip resistant rubber coating in a polka dot type pattern on the bottom of the sock. However, the foot can easily slip inside the sock, relocating the slip resistant polka dots to an unsafe location.

In addition, water board sports, such as surfing, stand up paddle boarding (SUP), kayaking, and the like are all water sports experiences that are enhanced when a sure foot can be reliably achieved with a long record of continued use in a water or salt water environment. The present invention is ideal for these applications, as they provide sure footing while being resistant to wear.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, in which like parts are given the same reference numerals, and wherein.

ELEMENT LIST

10. Slip resistant shoe
12. Toe grip
14. Arch recess

ELEMENT LIST -continued

16. Sesamoid recess
17. Instep rib
18. Ball of foot recess
19. Outstep rib
20. Arch rib
22. Instep
24. Instep recess
26. Bottom heel recess
28. Side heel recess
30. Cuff
32. Heel cup
33. Heel cuff
34. Heel cuff recess
36. Inside rib
38. Outsole
40. Arch
42. Outside rib
44. Bottom arch
46. Toe grip bottom
48. Sock
50. Toe
60. Dragonfly foot covering
62. Dragonfly design arch rib
64. Ball of foot covering
66. Inter-toe securement
68. Dragonfly wing straps
70. S-shaped foot covering
72. Ball of foot covering
74. Arch rib straps
76. Full sole shoe
78. Full sole
80. Full sole material shoe
82. Full material foot sole

DETAILED DESCRIPTION OF THE INVENTION

Referring now to the drawings in detail, the present shoe is made of a slip resistant material and is generally of a cage-like configuration to provide maximum slip resistance as well as ventilation with minimum structure, just sufficient enough structure to allow the shoe to provide grip on a surface. While practicing Barre, Yoga, Pilates, or any other similar style of floor exercise, comfort is paramount while sufficient grip on the floor is necessary to permit proper forms of the exercise. Such exercises have become very popular, but the contortions that one strives to achieve means that balance and pressure follow many directions, causing foot slippage of the person exercising.

As such, it is imperative for one desiring to engage in these types of exercises to provide gripping of the floor while maintaining comfort. In order to provide comfort, a shoe must have proper ventilation to allow for sweating or water drainage, while also providing positive gripping of a surface. Previous attempts to achieve these goals, for instance by Nike corporation, have resulted in a multitude of shoe designs made of non-slip plastics. However, those shoes have not provided a sufficient non-grip lower surface nor have they provided sufficient ventilation. While one is exercising, comfort is very important and a lack of pressure points is necessary.

Therefore, in accordance with the present invention, there is provided a novel slip resistant shoe that achieves all these goals for persons engaged in Barre, Yoga, Pilates and the like. The appendant drawings illustrate the advantages of the present inventions and provide detail when words are not sufficient, as a major portion of the shoe involves open spaces, holes and/or recesses forming the cage-like structure of the shoe.

Figure 1:
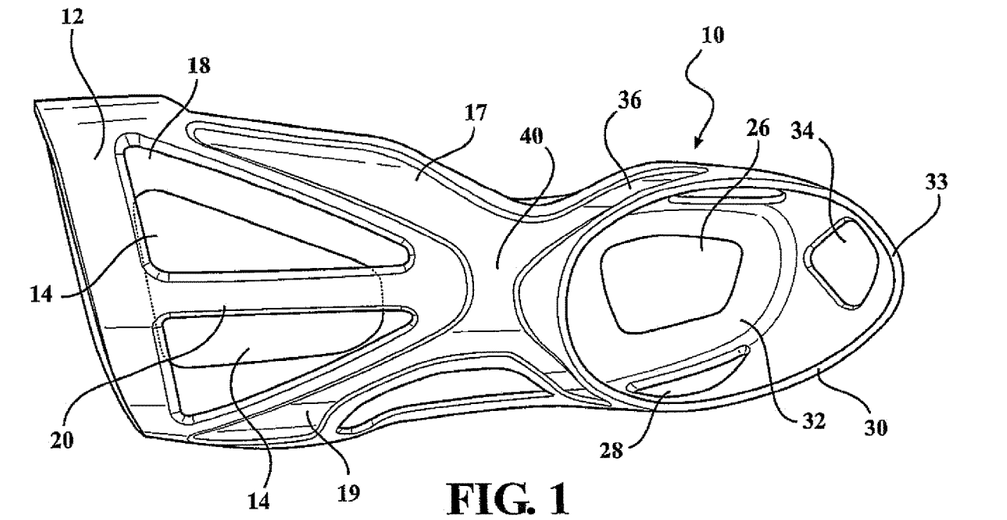
FIG. 1 is a top plan view of an slip resistant shoe made in accordance with the present invention.
Figure 2:
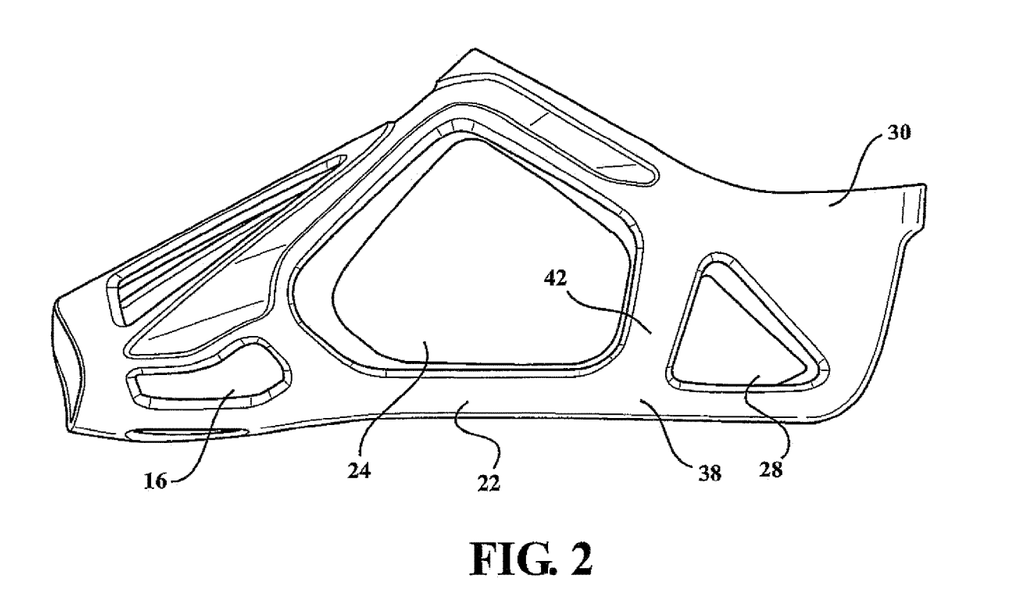
FIG. 2 is a side perspective view of my novel slip resistant shoe.

With combined reference to FIG. 1 and FIG. 2, shown are a top plan view and a side elevational view of my novel slip resistant shoe generally indicated by the numeral 10, which also includes a toe grip 12 at the proximal end of slip resistant shoe 10 which is integral with instep rib 17 and instep 22. Ball of foot recess 18 extends through the bottom of slip resistant shoe 10, while arch recess 14 extends through the top of slip resistant shoe 10 across the arch 40 of the slip resistant shoe 10. Arch rib 20 dissects the arch recess 14 to supply structure to slip resistant shoe 10. In order to provide more ventilation, sesamoid recess 16 extends through the side of slip resistant shoe 10 and is separated from arch recess 14 by instep rib 17. Outstep rib 19 and arch rib 20 define an arch recess 14 toward the outside of the shoe, while instep rib 17 and arch rib 20 define another arch recess 14 toward the ball of the foot.

Still looking specifically at FIG. 2, instep recess 24 appears on either side of slip resistant shoe 10 for maximum ventilation. Instep recess 24 is defined by either instep rib 17 or outstep rib 19 by instep 22 from the bottom, along with inside rib 36 with outside rib 42. Although any suitable configuration is contemplated by the present invention, for many structural considerations, instep recess 24 is preferably trapezoidal in shape, whereas arch recesses 14 are preferably predominantly triangular in shape. Furthermore, side heel recess 28 is also preferably triangular in shape. Side heel recess 28 is defined on the bottom by outsole 38, outside rib 42 on the side and on the top by cuff 30. Viewing slip resistant shoe 10 from the top in FIG. 1, one can observe bottom heel recess 26 surrounded by heel cup 32. Finally, a heel cuff recess 34 is formed within heel cuff 33 to provide ventilation and comfort.

Figure 3:
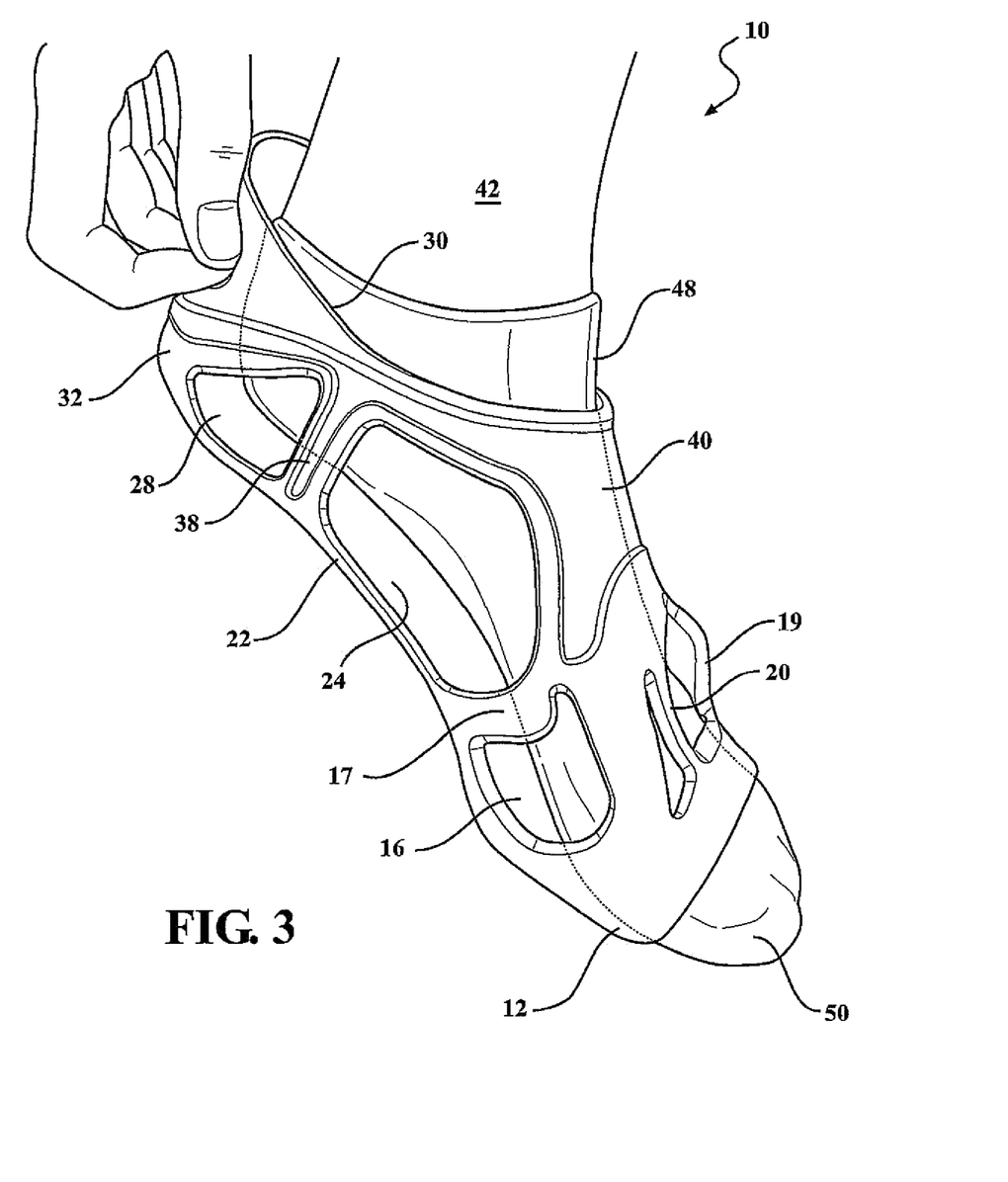
FIG. 3 is a top angled perspective view of another aspect of the present slip resistant shoe.

FIG. 3 shows an environmental view of the present invention wherein the person exercising has first put on a sock 48, and then slipped their foot with the sock thereon into the present slip resistant shoe, such that the foot has a sufficient amount of ventilation holes and/or recesses in the overlying shoe to alleviate foot sweating while providing enough support to prevent food slippage on the floor while exercising. As can be seen in FIG. 3, this slip resistant shoe is generally denoted by numeral 10, including all the elements and features shown in the previous FIGS., wherein a toe grip portion 12 helps to define sesamoid recess 16, while arch rib 20 emanates from toe grip 12 to define arch 40. Outside rib 42 and instep 22 define more of the recesses, including instep recess 24 and side heel recess 28. Toes 50 extend from the slip resistant shoe 10 to provide more control and balance.

Figure 4:
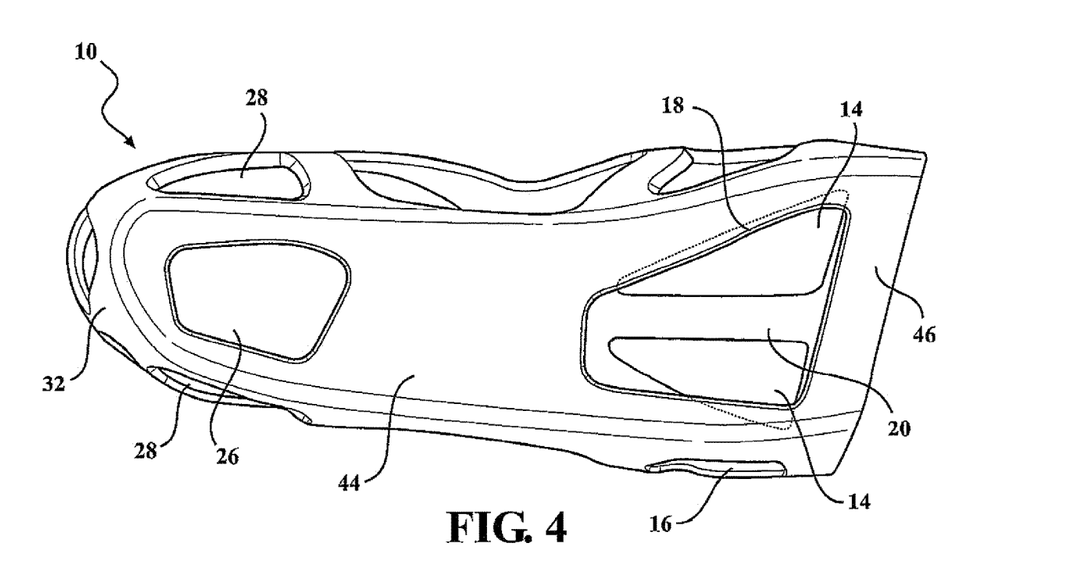
FIG. 4 is a bottom plan view of the slip resistant shoe, illustrating the recesses on the underside of the slip resistant shoe.

Looking next to FIG. 4, there is shown a bottom plan view of the present slip resistant shoe, illustrating the relative placement of bottom heel recess 26, defined by heel cup 32 and bottom arch 44, and ball of foot recess 18 defined by toe grip bottom 46 and the remainder of slip resistant shoe 10. Bottom heel recess 26 and ball of foot recess 18 allow the person wearing slip resistant shoe 10 to feel the floor surface upon which she is exercising, providing more control and balance, two attributes critical to productive exercising in the manner of Barre, Yoga, Pilates and other floor type exercises.

Figure 5:
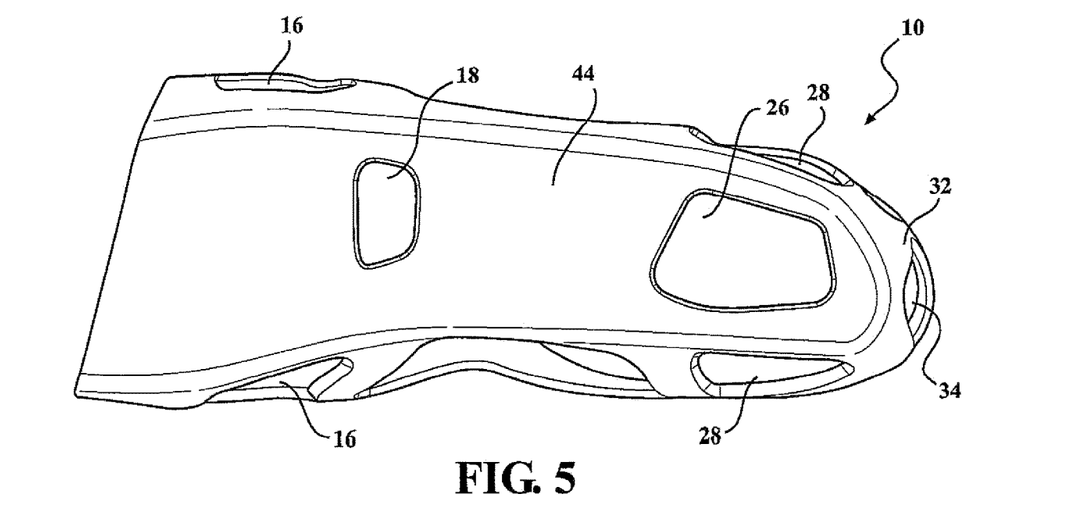
FIG. 5 shows another aspect of the present invention with smaller recesses in the sole of the shoe to provide greater traction.

FIG. 5 discloses yet another aspect of the present invention with smaller recesses in the bottom of the sole of the slip resistant shoe to provide greater traction for the person in both the heel and the ball of foot areas, 26 and 18 respectively, while exercising. Heel recess 26 may be from 20 to 35 centimeters across and from 25 to 40 centimeters long, while the ball of foot recess 18 may be from 20-30 centimeters across and from 10 to 20 centimeters long. The two recesses may be separated along the longitudinal axis of the shoe from 50 to 75 centimeters. Ball of foot recess 18 is preferably proximal to the heel and behind the actual ball of the foot to prevent slipping.

Figure 6A:
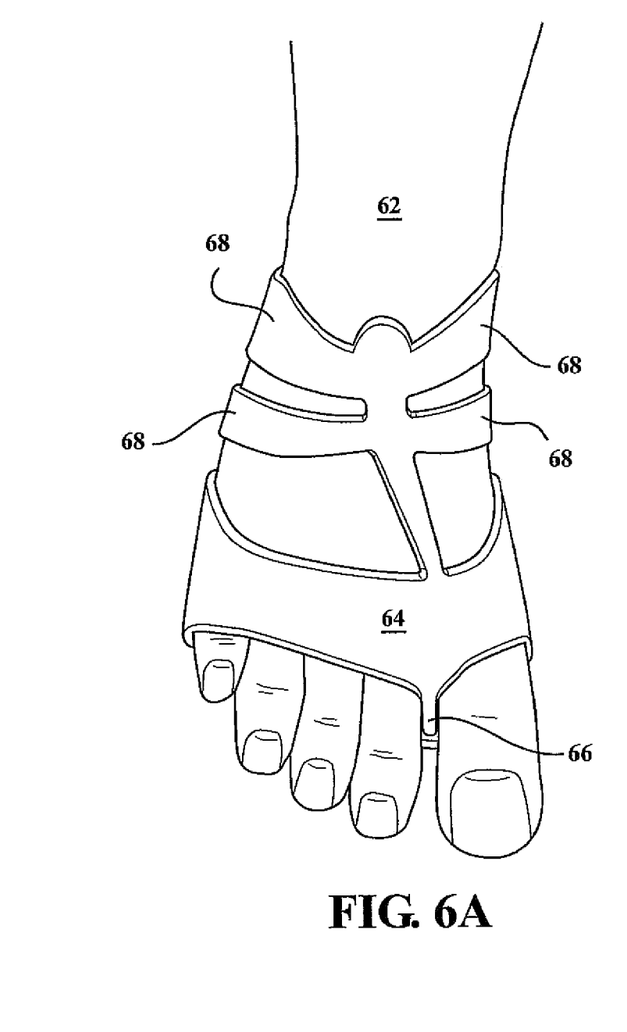
FIGS. 6A and 6B illustrate aspects of the present invention utilizing a dragonfly design for the shoe/sock.
Figure 6B:
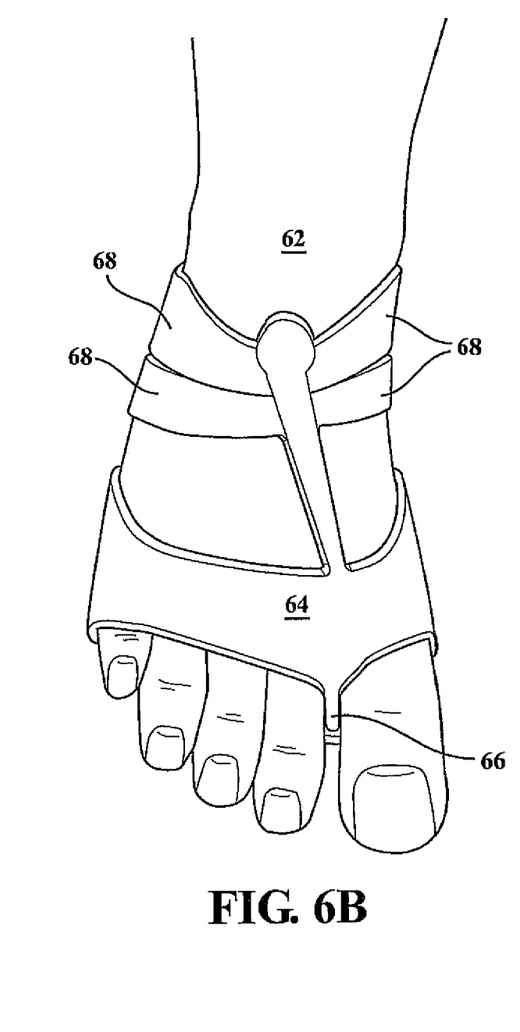

In yet another aspect of the present invention, FIG.'s 6A and 6B, respectively, illustrates an especially efficient design resembling a dragonfly motif for either the slip resistant shoe, or as an optional fabric sock, generally denoted by numeral 60, wherein the uncovered areas represent an open vented recess for allowing air ventilation while still providing enough support to permit proper exercise forms without slipping on a smooth floor. The body of the dragonfly 62 has wings 68 emanating therefrom, and the wings 68 act as the straps for securing the shoe/sock about the upper portion of the foot, while the ball of foot covering 64 may include a toe cleaver 66 to be inserted between the big toes and the other toes of the wearer. In the instance of this design being used for a sock to be worn within the shoe configuration of the remaining aspects of the present invention, any suitable fabric, as described hereinabove, may be utilized. Especially useful is a neoprene type of material, such as chloropene or polychloroprene, as it can "grip" the floor to permit more complex exercises. Other sock materials are suitable including knits of all types, rubber coated bottoms, whether continuous or intermittent. This dragonfly design may be used for either the shoe or the sock to be worn inside the shoe, or it may be utilized on the shoe or the sock singly.

Figure 7:
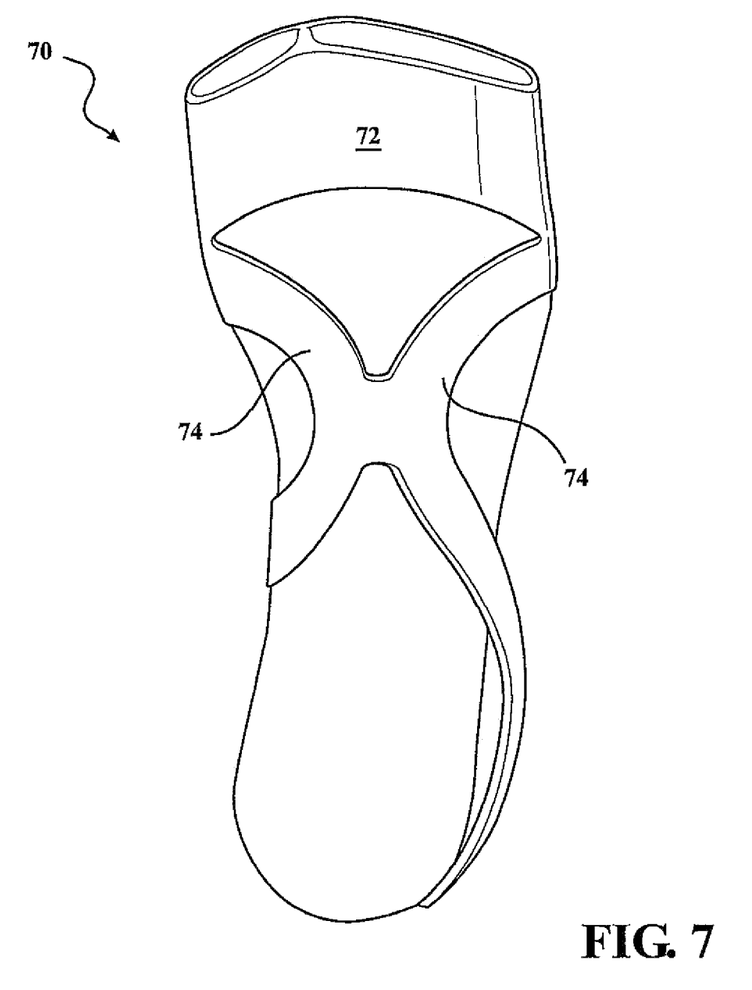
FIG. 7 shows a double S-shaped configuration for the shoe/sock.

FIG. 7 shows yet another aspect of the present invention wherein a double S-shaped configuration is a suitable design for either a shoe or a sock to be worn singly or in combination. The shoe/sock combination is generally denoted by the numeral 70, and includes a ball of foot covering 72 with a pair of S-shaped support straps 74 that cover the arch of the foot of the wearer. The bottom of the shoe/sock may have recesses therein for grip and traction, while other aspects of this invention may have a solid bottom, as shown in FIGS. 8 and 9 hereinbelow.

Figure 8:
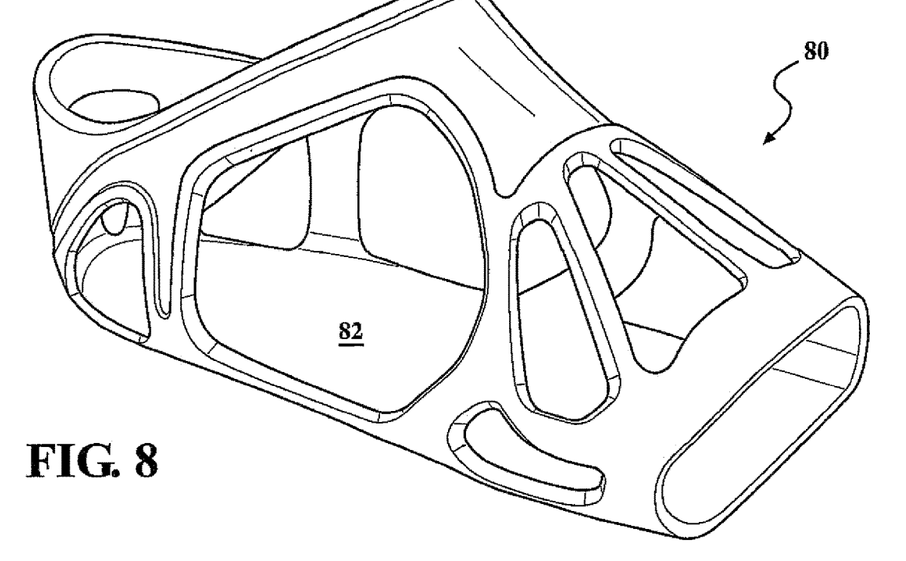
FIG. 8 shows a perspective view of another aspect of the shoe with a full sole.
Figure 9:
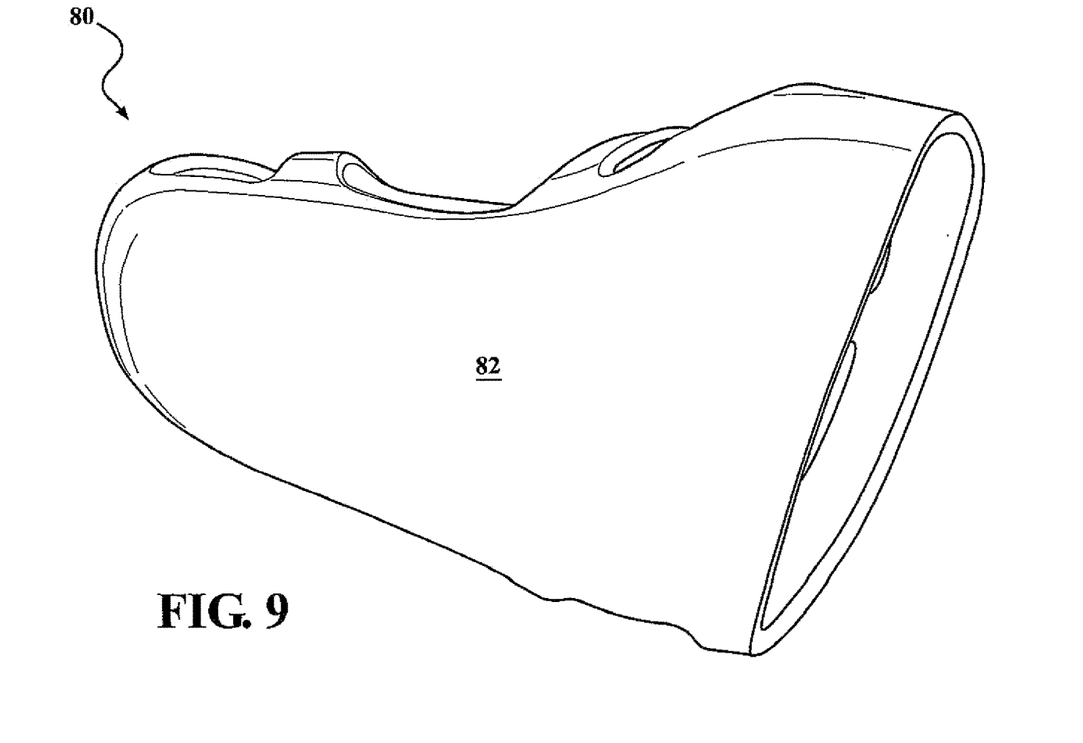
FIG. 9 is a bottom elevational view of the full sole shoe of FIG. 8.

With combined reference to FIGS. 8 and 9, there is shown yet another aspect of the present invention wherein the sole 82 of the shoe 80 is a solid piece, without recesses, such that nearly the entire bottom of the shoe acts as a grippy surface while performing exercises. For some of the applications of the present invention, such as preventing falling or alleviating fall risk, it may be preferable for an aspect of the invention to provide a full sole portion with a non-slip property.

Further, although not shown, the inventor envisions another aspect of the present invention wherein a full toe covering may be useful, as well as a full boot-like structure, both of which would advantageously be made of the same non-slip grippy material described more fully in detail hereinbelow. Another aspect may include a sole extension under the toes of the user while leaving the top of the tops open to the air. One of the greatest advantages of the present invention is the grippiness and the stretchiness of the shoe material, heretofore not seen in the industry. In addition, the fact that it is puncture resistant provides safety while riverwalking or beachcombing over rocks or other projectiles.

While grip can be measured quantitatively with certainty, it must be measured relative to various surfaces. The present invention can perform non-slip properties from a value of 1.0 Newton/millimeter to over 50 Newtons/millimeter before failure, although these values are dependent upon the surface to which they are measured. As one can imagine, as the surface area that contacts the bottom of the present invention shoes increased, the amount of grip needed to prevent failure increases. In other words, if the present shoe is being measured for non-slip behavior on a smooth wooden floor surface, then there would be substantial grip. However, on the other hand, In regards to a full disclosure of the features and advantages of the present invention, a slip resistant shoe is preferred of a non-slip rubber-like grippy shoe having exposed foot recesses defining ventilations in at least the topside arch portion of the shoe. Although various materials may be comprising the shoe, it is preferred if said non-slip grippy shoe is made of an integral cage-like configuration with at least one ventilation recess in the arch portion of the shoe. Further, certain preferred aspects of the invention include an exposed toe configuration, and at least two more recesses in the ventilated portions of the shoe as defined by ribs of the cage are also preferred. As such, at least two recesses in the topside of the shoe are defined by ribs emanating outwardly from the arch portion of the shoe, thereby forming a cage-like configuration of a low hardness polymeric elastomer with elongation from about 50% to about 1000%, providing a non-slip grippy shoe. The recesses in the shoe generally are preferably comprised of at least 50% of the entire upper shoe surface, to provide maximum ventilation while still providing sufficient support. The ribs of the arch portion of the shoe preferably cover at least about 30% of the foot arch total area.

In addition, in some aspects, the slip resistant shoe further comprises a single toe securement rib located between the big toe and the remaining toes, although it is also envisioned that certain applications may warrant securement ribs located between each of the toes.

In another aspect of the present invention, a slip resistant shoe is disclosed which comprises an integral shoe with multiple negative space recesses in at least the top of the shoe, where the recesses provide ventilation. The non-slip shoe is preferably made of a stretchy rubber-like grippy elastomeric polymeric and resinous material, including materials selected from the group consisting of thermoplastic elastomers, chloroprenes, polychloroprenes, silicone based polymers, various vinyl compositions, nitrile rubber, rubber-like materials, epoxies, urethanes, polyaspartics, methyl methacrylates (MMA), vinyl esters, and combinations thereof. The shoe preferably exhibits a good non-slip gripping texture that is easy to work with and has a suitable Shore A value, and about a 5 second, injection molded hardness of about 46 with an ability to take any color for making for many decorative finishes that are attractive to female exercisers, for matching their exercise clothing, along with low hardness and medium heat resistance, and a capability of being processed by injection molding. The elastomeric polymer material has a durometer of from 20-100 Shore A, an elongation of from 50% to 1000%, a tensile strength range of from 300 to 5000 psi, tear resistance of from 1.0 to 50.0 N/mm that is slip resistant, waterproof and chemically resistant, and is workable for long periods of time at a temperature of from 300° F. to about 500° F.

Suitable Materials

Useful materials for making the shoe are stretchy rubber-like grippy polymeric and resinous materials, including thermoplastic elastomers, polypropylenes, chloroprenes, polychloroprenes, silicone based polymers, various vinyl compositions, nitrile rubber, rubber-like materials, epoxies, urethanes, polyaspartics, methyl methacrylates (MMA), and vinyl esters. Especially useful elastomers include thermoplastic vulcanizate elastomers with their features such as low hardness and medium heat resistance, along with the fact that it may be processed by injection molding, their properties make this material ideal for a soft rubber-like shoe that exhibits a good non-slip gripping texture. Furthermore, it is a material that is easy to work with and has a suitable Shore A value, setting up in about 1-10 seconds, usually around 5 seconds. The thermoplastic vulcanizate elastomers have an injection molded hardness of about 46 at a processing temperature of from about 350° F. to about 475° F. Its ability to take any color, including polyolefin-based color concentrations, makes it suitable for many decorative finishes that are attractive to the market of female exercisers, especially to match their exercise clothing.

The best mode of the present invention includes an elastomeric polymer material with a durometer of from 20-100 Shore A, an elongation of from 50% to 1000%, a tensile strength range of from 300 to 5000 psi, tear resistance of from 1.0 to 15.0 N/mm that is slip resistant, waterproof and chemically resistant. A preferred material that is suitable for exhibiting these properties is a thermoplastic vulcanizate elastomer capable of being injection molded into a shoe shape.

Another suitable material includes a high performance engineering elastomer which possesses the combined properties of rubber and engineering thermoplastics, sold as Hytrel®, a rubber-like grippy material, is commercially available from DuPont Corporation of Wilmington, Del. Hytrel® offers excellent strength, heat resistance, low temperature properties, chemical resistance and exhibits good processability along with rubber elasticity.

Method of Manufacturing

Further in accordance with the present invention, a method of manufacturing includes providing a polymeric material, including urethane material especially suitable for stretching over a foot, or a foot with a sock on, as well as a material that is extremely comfortable without applying stress on pressure points. The method includes the use of a multi-part mold suitable for injection molding of the shoe.

In practicing the method of the present invention, injection molding may be utilized by injecting the thermoplastic elastomer into a mold having inserts to create the negative areas of the shoe. Molding the thermoplastic elastomer or urethane or other suitable material is achieved by injecting the urethane into a multi-part mold and releasing the part after injection.

A method of manufacturing a slip resistant shoe includes providing a thermoplastic elastomeric material, injecting the thermoplastic elastomeric material into a multi-piece injection mold having multiple inserts covering more than half of the surface area of the arch portion of the slip resistant shoe, whereby negative spaces are formed when said multiple inserts are removed after injection of the thermoplastic elastomeric material, and allowing the material to set in a time period of from 2 to 60 seconds. Thereby, a single material slip resistant shoe results that exposes at least 50% open area.

Method of Using

Further in accordance with the present invention is a method of using the slip resistant shoe for floor exercises, wherein the slip resistant shoe may be used with or without a sock. The shoe is worn on a person's foot, allowing their toes to extend out of the shoe, such that when performing certain exercises, the shoe and/or the sock aspects of the present invention prevent slipping on a slick surface floor or on a slippery water sports device, thereby permitting more difficult exercises to be performed without fear of injury.

For use on water sports boards, the slip resistant shoe of the present invention is an ideal choice as the material used for production, ie. especially thermoplastic vulcanizate elastomers, due to the non-slip gripping properties exhibited.

In practicing the present invention method of an exerciser using a rubber-like grippy elastomeric exercising shoe having multiple recesses in at least a top portion of the exercising shoe, a user will insert their foot into the rubber-like grippy elastomeric exercising shoe, and align the multiple recesses of the shoes over the user's pressure points on their foot to prevent pressure points from hindering exercising due to pressure pain. Then, the user can perform any type of exercise, including floor exercises, such as Barre, Yoga, Pilates or the like by using the rubber-like grippy elastomeric shoe to provide balance and posture in the performance of the exercise.

In practicing the present invention, the non-slip properties of the present shoe invention find particular utility for practicing any floor exercise, including barre, yoga, Pilates and the like, as well as gymnastics, acrobatics, wrestling, climbing, tight rope walking, circuit training, ultimate fighting, ultimate fighting, Palaton cycling and instudio cycling, to name a few of the exercise applications. In addition, the present invention finds utility in hospital settings to reduce the likelihood of slipping and falling for fall risk patients, as well as in showers and in convalescent homes. These activities generally require a non-slip value of from 1.0 to over 50 Newtons/millimeter before failure occurs. Failure values depend upon the surface being contacted, as well as the weight of the user, although most applications fall within this range.

In summary, numerous benefits have been described which result from employing any or all of the concepts and the features of the various specific aspects of the present invention, or those that are within the scope of the invention. The new slip resistant shoe acts perfectly for comfortable exercise in Barre, Yoga or Pilates style floor exercises as well as in the practice of numerous water sports. Furthermore, the present invention is useful for providing solid gripping for fall risk patients in hospitals and convalescent settings.

The foregoing description of a preferred aspect of the invention has been presented for purposes of illustration and description. It is not intended to be exhaustive or to limit the invention to the precise form disclosed. Obvious modifications or variations are possible in light of the above teachings with regards to the specific aspects. The aspect was chosen and described in order to best illustrate the principles of the invention and its practical applications to thereby enable one of ordinary skill in the art to best utilize the invention in various aspects and with various modifications as are suited to the particular use contemplated. It is intended that the scope of the invention be defined by the claims which are appended hereto.

INDUSTRIAL APPLICABILITY

The present invention finds utility in the performance of floor exercises, water sports and hospital and healthcare facility industries to provide a slip resistant shoe.

What is claimed is:

1. A slip resistant shoe, comprising:
   an integrally constructed non-slip grippy body made of a polymeric elastomer selected from the group consisting of thermoplastic vulcanizate elastomers, thermoplastic elastomers and combinations thereof, said non-slip grippy body having a plurality of apertures that define ventilation portions configured to expose a foot of the wearer in at least a ventilated instep of the body;
   the non-slip grippy body being truncated such that toes of the wearer are exposed when worn; and the plurality of apertures being defined and separated from each other by strap portions;
   said plurality of apertures in the instep comprising at least 50% negative ventilated space of the instep of the body;
   wherein at least one aperture of the plurality of apertures is located in a sole region of the body and configured to expose a sole of the foot when worn;
   the polymeric elastomer having an elongation from about 50% to about 1000%, the non-slip grippy body configured to perform non-slip properties from a value of 1.0 Newton/millimeter to over 50 Newtons/millimeter before failure.

2. The slip resistant shoe of claim 1, further comprising a single toe securement strap portion defining a first toe aperture configured for a big toe and a second toe aperture configured for a set of remaining toes.

* * * * *